US009732908B2

(12) United States Patent
Kanno et al.

(10) Patent No.: US 9,732,908 B2
(45) Date of Patent: Aug. 15, 2017

(54) CRYOGENIC TANK

(71) Applicant: IHI Corporation, Tokyo (JP)

(72) Inventors: Ryuzo Kanno, Tokyo (JP); Michitaka Furikoma, Tokyo (JP); Eiji Kamiya, Tokyo (JP); Yasuhiro Shimamura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/153,865

(22) Filed: May 13, 2016

(65) Prior Publication Data

US 2016/0252213 A1 Sep. 1, 2016

Related U.S. Application Data

(63) Continuation of application No. PCT/JP2014/079028, filed on Oct. 31, 2014.

(30) Foreign Application Priority Data

Nov. 19, 2013 (JP) .................... 2013-238825

(51) Int. Cl.
  F17C 13/00 (2006.01)
  F17C 13/12 (2006.01)
  F17C 1/00 (2006.01)
(52) U.S. Cl.
  CPC ............ F17C 13/001 (2013.01); F17C 13/12 (2013.01); F17C 1/00 (2013.01);
  (Continued)

(58) Field of Classification Search
  CPC .... F17C 13/001; F17C 13/12; F17C 2203/03; F17C 2203/012; F17C 2209/232;
  (Continued)

(56) References Cited

U.S. PATENT DOCUMENTS 4,041,722 A * 8/1977 Terlesky ................. F17C 3/022
                                                                165/45
2006/0117566 A1  6/2006  Yang et al.
  (Continued)

FOREIGN PATENT DOCUMENTS

JP       49-76112 A    7/1974
JP       60-61596 U    4/1985
  (Continued)

OTHER PUBLICATIONS

International Search Report mailed Feb. 3, 2015 in PCT/JP2014/079028 (4 pages).

Primary Examiner — Robert J Hicks
Assistant Examiner — Kareen Thomas
(74) Attorney, Agent, or Firm — Rothwell, Figg, Ernst & Manbeck, P.C.

(57) ABSTRACT

A cryogenic tank includes a heat insulating material layer which is disposed between a concrete wall and a membrane and includes a secondary barrier layer in an inner portion of the heating insulating material, and a membrane anchor mechanism which penetrates the secondary barrier layer, is fixed to the concrete wall, and presses the membrane. The membrane anchor mechanism includes a seal portion which covers a through portion penetrating the secondary barrier layer.

2 Claims, 8 Drawing Sheets

(52) U.S. Cl.
CPC .................... F17C 2201/0157 (2013.01);
F17C 2201/052 (2013.01);
F17C 2203/012 (2013.01);
F17C 2203/03 (2013.01);
F17C 2203/035 (2013.01);
F17C 2203/0604 (2013.01);
F17C 2203/0629 (2013.01);
F17C 2203/0678 (2013.01);
F17C 2205/0332 (2013.01);
F17C 2209/232 (2013.01);
F17C 2221/012 (2013.01);
F17C 2223/0123 (2013.01);
F17C 2223/0161 (2013.01);
F17C 2223/033 (2013.01);
F17C 2225/036 (2013.01);
F17C 2260/036 (2013.01);
F17C 2260/042 (2013.01);
F17C 2270/0178 (2013.01);
F17C 2270/0184 (2013.01);
Y02E 60/321 (2013.01)

(58) Field of Classification Search
CPC ........ F17C 2260/036; F17C 2205/0332; F17C 2221/012; F17C 2225/036; F17C 1/00; F17C 2270/0184; F17C 2260/042; F17C 2223/0161; F17C 2201/0157; F17C 2270/0178; F17C 2203/0678; F17C 2203/0604; F17C 2223/0123; F17C 2201/052; F17C 2223/033; F17C 2203/035; F17C 2203/0629; Y02E 60/321

USPC ........................ 220/560.04–560.14
See application file for complete search history.

(56) References Cited

U.S. PATENT DOCUMENTS

| | | | |
|---|---|---|---|
| 2006/0118018 A1 | 6/2006 | Yang et al. | |
| 2006/0118019 A1 | 6/2006 | Yang et al. | |
| 2006/0131304 A1 | 6/2006 | Yang et al. | |
| 2007/0028823 A1 | 2/2007 | Yang et al. | |
| 2007/0181586 A1* | 8/2007 | Van Ootmarsum | F17C 3/022 220/592.26 |
| 2011/0315691 A1* | 12/2011 | Skovholt | F17C 3/022 220/560.12 |

FOREIGN PATENT DOCUMENTS

| | | |
|---|---|---|
| JP | 61-84500 A | 4/1986 |
| JP | 61-156799 U | 9/1986 |
| JP | 61-49468 B2 | 10/1986 |
| JP | 62-117397 U | 7/1987 |
| JP | 63-23440 B2 | 5/1988 |
| JP | 7-233899 A | 9/1995 |
| JP | 2002-276894 A | 9/2002 |
| JP | 2010-242973 A | 10/2010 |
| JP | 4616279 B2 | 1/2011 |
| JP | 5076779 B2 | 11/2012 |
| WO | 2013/004944 A1 | 1/2013 |

* cited by examiner

CRYOGENIC TANK

This application is a continuation application based on a PCT Patent Application No. PCT/JP2014/079028, filed on Oct. 31, 2014, whose priority is claimed on Japanese Patent Application No. 2013-238825, filed on Nov. 19, 2013. The contents of both the PCT Application and the Japanese Application are incorporated herein by reference.

TECHNICAL FIELD

The present embodiments described herein relate to a cryogenic tank.

BACKGROUND

In the related art, in a membrane type cryogenic tank including a membrane in which a plurality of membrane panels are welded, in order to maintain a shape of a thin membrane having low stiffness, a configuration in which the membrane is supported to be pressed to a concrete wall via a heat insulating material by a membrane anchor mechanism is used (for example, refer to Japanese Examined Patent Application, Second Publication No. S63-23440).

SUMMARY

In the membrane type cryogenic tank, a secondary barrier for preventing a stored liquid from being leaked to the outside when a membrane is cracked or the like, is provided as necessary. For example, a secondary barrier layer is provided to be included in a heat insulating material layer disposed between a concrete wall and the membrane, and thus, the secondary barrier may be disposed in the inner portion of the heat insulating material layer. However, when a membrane anchor mechanism is fixed to the concrete wall, the membrane anchor mechanism may penetrate the heat insulating material layer. Accordingly, if the secondary barrier layer is provided on the heat insulating material layer, the membrane anchor mechanism penetrates the secondary barrier layer, and thus, liquid tightness of the secondary barrier layer is decreased.

The present disclosure is made in consideration of the above-described problem, and an object thereof is to improve liquid tightness of a cryogenic tank having a membrane anchor mechanism which penetrates the secondary barrier layer.

The present disclosure adopts the following configurations as means for solving the above-described problem.

According to a first aspect of the present disclosure, there is provided a cryogenic tank including: a heat insulating material layer which is disposed between a concrete wall and a membrane and includes a secondary barrier layer in an inner portion of the heating insulating material; and a membrane anchor mechanism which penetrates the secondary barrier layer, is fixed to the concrete wall, and presses the membrane, in which the membrane anchor mechanism includes a seal portion which covers a through portion penetrating the secondary barrier layer.

In the present disclosure, the through portion through which the membrane anchor mechanism penetrates the secondary barrier layer is covered by the seal portion. Accordingly, even if the membrane is damaged, it is possible to prevent a liquid from being leaked from the through portion. Therefore, according to the present disclosure, it is possible to improve liquid tightness in the cryogenic tank which includes the membrane anchor mechanism penetrating the secondary barrier layer.

DETAILED DESCRIPTION OF THE DISCLOSURE

Hereinafter, an embodiment of a cryogenic tank according to the present disclosure will be described with reference to the drawings. Moreover, in the following drawings, in order to allow each member to be of a recognizable size, the scale of each member is appropriately changed.

Figure 1:
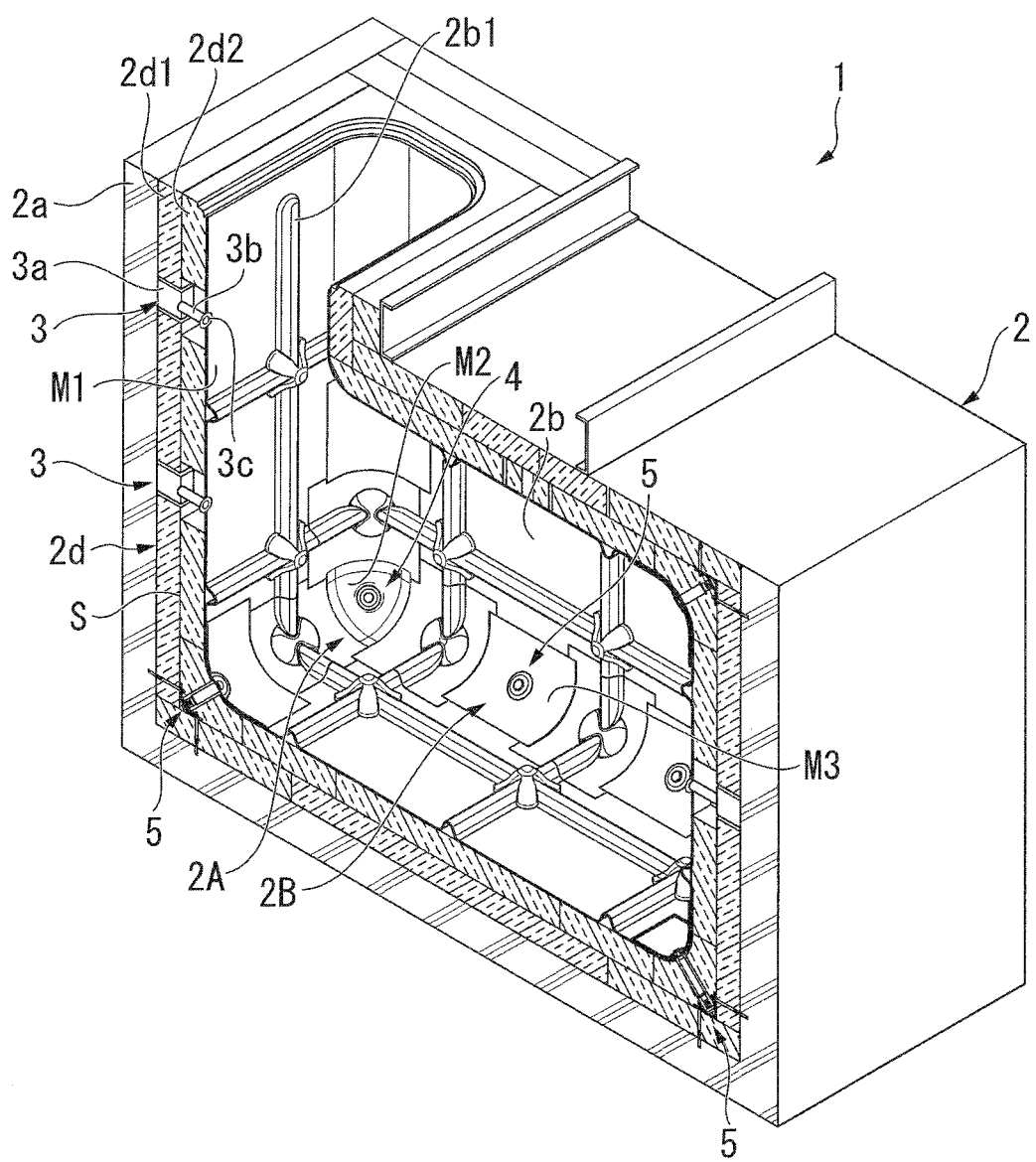
FIG. 1 is a cross-sectional perspective view showing a cryogenic tank according to an embodiment of the present disclosure.

FIG. 1 is a cross-sectional perspective view showing a cryogenic tank 1 of the present embodiment. The cryogenic tank 1 includes a container main body 2, a plane membrane anchor mechanism 3, a three-surface corner membrane anchor mechanism 4, a two-surface corner membrane anchor mechanism 5, and a seal portion 6.

The container main body 2 is a rectangular container which includes a concrete wall 2a forming an outer tank, a membrane 2b forming an inner tank, a vapor barrier 2c (refer to FIG. 2) stuck to an inner wall surface of the concrete wall 2a, and a cold insulating material layer 2d (heat insulating material layer) installed between the vapor barrier 2c and the membrane 2b.

The concrete wall 2a is a wall portion formed of concrete which forms an outer shell of the container main body 2 and a strength member which supports the membrane 2b or the like. The membrane 2b is a portion which directly comes into contact with a cryogenic liquid (for example, liquefied argon) stored in an inner portion of the tank, and is installed on the inner wall surface side of the concrete wall 2a via the cold insulating material layer 2d. A corrugation 2b1 which vertically and horizontally extends in a lattice shape and absorbs thermal deformation of the membrane 2b is provided on the membrane 2b. For example, the membrane 2b is formed by welding a sheet shaped membrane panel which is forming of stainless steel and has a thickness of several millimeters.

Since the container main body 2 is formed in a rectangular shape, the container main body 2 includes a corner portion (hereinafter, referred to as a three-surface corner portion 2A) formed at a location at which three surfaces (for example, two side wall surfaces and a bottom surface, or two side wall surfaces and a top surface) are collected, and a corner portion (hereinafter, referred to as a two-surface corner portion 2B) formed at a location at which two surfaces (for example, the side wall surface and the bottom surface, the side wall surfaces, or the side wall surface and the top surface) are collected. The membrane panel which is disposed on the corner portions is curved according to the shapes of the corner portions. Hereinafter, the membrane panel on a plane which is disposed on a region other than the corner portions is referred to as a plane membrane panel M1, the membrane panel which is disposed on the three-surface corner portion 2A is referred to as a three-surface corner membrane panel M2 (corner membrane panel), and the membrane panel which is disposed on the two-surface corner portion 2B is referred to as a two-surface corner membrane panel M3.

The vapor barrier 2c is a metal sheet member which is provided to abut the entire region of the inner wall surface of the concrete wall 2a. The vapor barrier 2c blocks water or the like passing through the concrete wall 2a and improve airtightness of the container main body 2.

For example, the cold insulating material layer 2d is formed of Poly Urethane Foam (PUF), and a gap between the membrane 2b and the vapor barrier 2c is filled with the cold insulating layer. The cold insulating material layer 2d includes an outer layer portion 2d1, an inner layer portion 2d2, and a filling portion 2d3 (refer to FIG. 2 or the like). The outer layer portion 2d1 is a layer which forms the concrete wall 2a side of the cold insulating material layer 2d, and is formed by laying cold insulating panels H1 having the same thickness without a gap. The inner layer portion 2d2 is a layer which forms the membrane 2b side of the cold insulating material layer 2d, and is formed by laying cold insulating panels H2 having the same thickness without a gap. The filling portion 2d3 is a portion which is filled with respect to a gap generated when the outer layer portion 2d1 and the inner layer portion 2d2 are laid, and has a shape coincident with the shape of the installed gap. For example, as the filling portion 2d3, a member (hereinafter, referred to as a filling portion for three-surface corner portion 2d4) which is filled in a gap (refer to FIG. 2) formed between a base portion 4b and an outer layer portion 2d1 of the three-surface corner membrane anchor mechanism 4 described below, or a member (hereinafter, referred to as a filling portion for two-surface corner portion 2d5) which is filled in a gap (refer to FIG. 4) formed between a base portion 5b and an outer layer portion 2d1 of the two-surface corner membrane anchor mechanism 5 described below is installed.

The cold insulating material layer 2d includes a secondary barrier layer S in an inner portion thereof (for example, a portion between the outer layer portion 2d1 and the inner layer portion 2d2). The secondary barrier layer S is a layer which is formed of a thin film such as an epoxy resin reinforced by a glass cloth, and functions as a secondary barrier which prevents a liquid stored inside the membrane 2b from being leaked to the outside if the membrane 2b is damaged.

A through-hole 7 which is disposed at a center position in the thermal deformation part of each membrane panel is provided on the membrane 2b and the cold insulating material layer 2d. An anchor 3b of the plane membrane anchor mechanism 3, an anchor 4e of the three-surface corner membrane anchor mechanism 4, or an anchor 5e of the two-surface corner membrane anchor mechanism 5 is inserted into the through-hole 7.

The plane membrane anchor mechanism 3 includes a base 3a which is provided on the inner wall surface of the concrete wall 2a via the vapor barrier 2c, the anchor 3b which is fixed to the base 3a and is inserted into the through-hole 7, and a pressing part 3c which is fixed to the anchor 3b exposed from the through-hole 7 and presses the plane membrane panel M1 from the inner portion side of the container main body 2 toward the concrete wall 2a.

Figure 2:
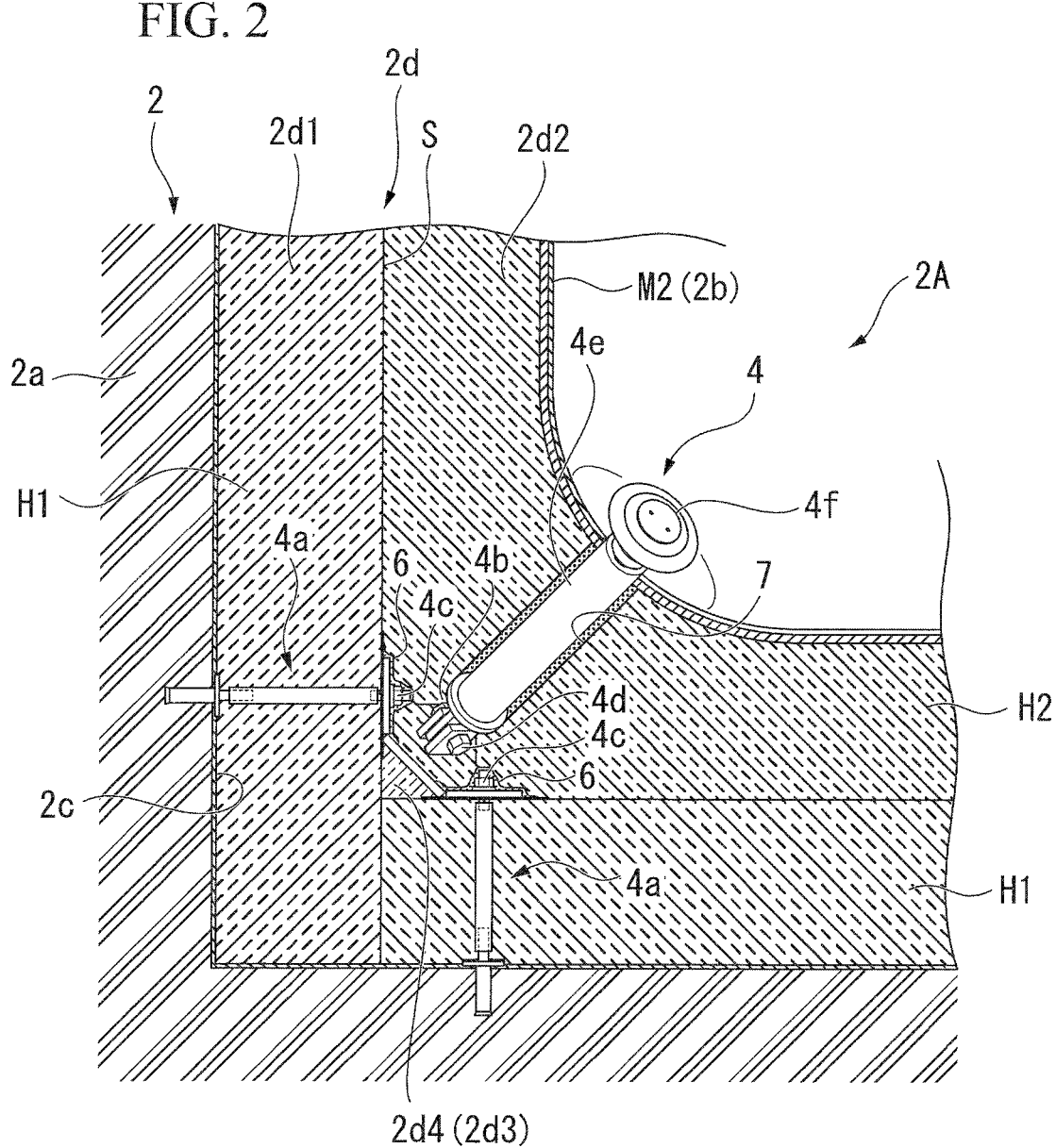
FIG. 2 is a cross-sectional view showing a three-surface corner portion including a three-surface corner membrane anchor mechanism included in the cryogenic tank according to the embodiment of the present disclosure.
Figure 3:
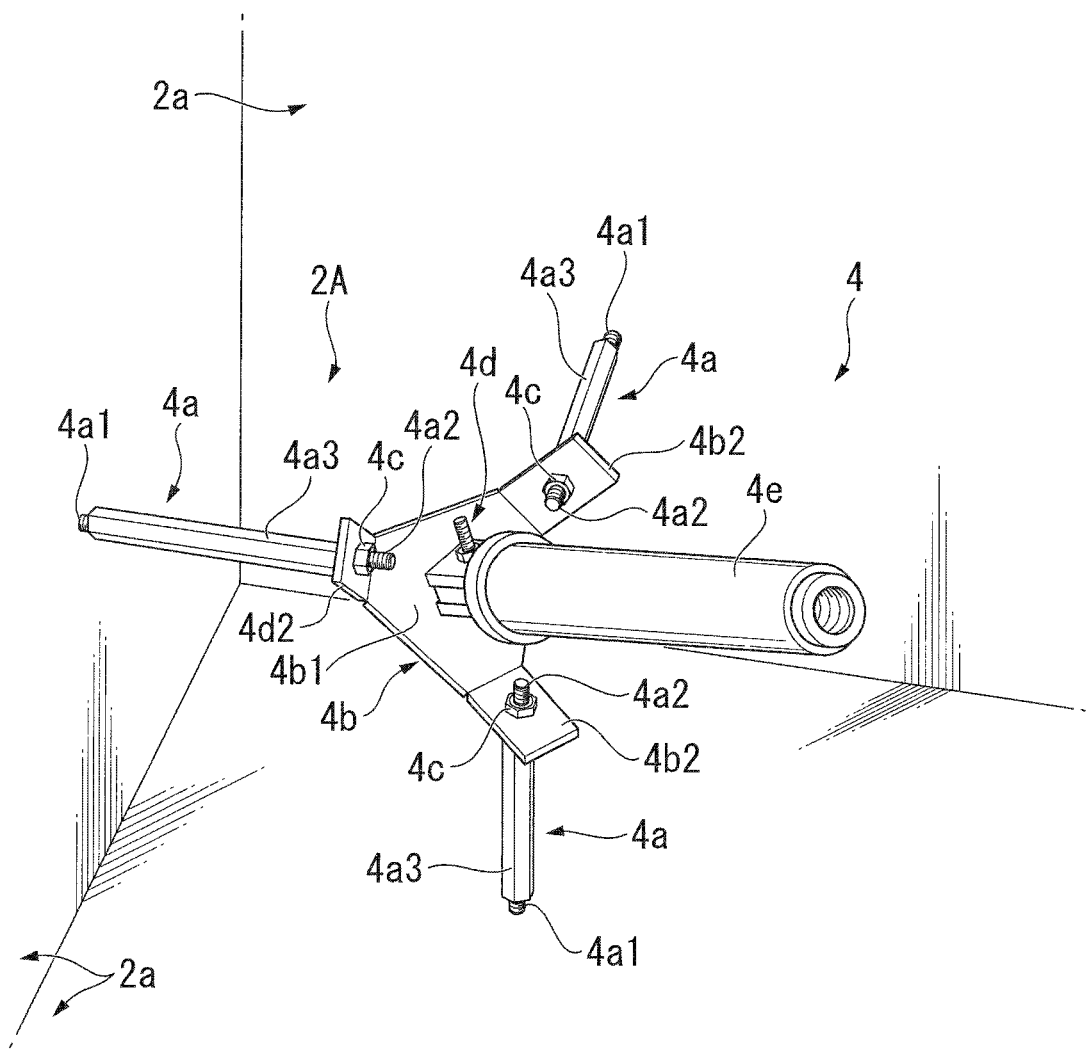
FIG. 3 is a perspective view showing the three-surface corner membrane anchor mechanism included in the cryogenic tank according to the embodiment of the present disclosure in which a pressing part of the three-surface corner membrane anchor mechanism is removed and a cold insulating material layer is omitted.

FIG. 2 is a cross-sectional view showing the three-surface corner portion 2A including the three-surface corner membrane anchor mechanism 4. Moreover, FIG. 3 is a perspective view in which the pressing part 3c of the three-surface corner membrane anchor mechanism 4 is removed and the cold insulating material layer 2d is omitted.

As shown in the drawings, the three-surface corner membrane anchor mechanism 4 is provided on the three-surface corner portion 2A, and includes a leg portion 4a which is provided on each of the three surfaces forming the three-surface corner portion 2A, a base portion 4b, a nut 4c, a joint 4d, the anchor 4e, and the pressing part 4f.

The leg portion 4a is a rod-shaped member which extends in the direction perpendicular to the inner wall surface of the concrete wall 2a, and is erected on the concrete wall 2a via the vapor barrier 2c. The leg portion 4a includes a first stud bolt 4a1 which is formed on one end portion of the concrete wall 2a side, a second stud bolt 4a2 which is formed on one end portion of the base portion 4b side, and a long nut 4a3 which forms a center portion of the leg portion. A length of the leg portion 4a except for the second stud bolt 4a2 is approximately the same as the thickness in the outer layer portion 2d1 of the cold insulating material layer 2d, and the leg portion penetrates the secondary barrier layer S included in the cold insulating material layer 2d and is fixed to the concrete wall 2a.

The first stud bolt 4a1 penetrates the vapor barrier 2c, one end side of the first stud bolt is embedded in the concrete wall 2a, screw grooves are formed on the other end side, the other end is attached to protrude to the inner portion side of the container main body 2 from the vapor barrier 2c, and the first stud bolt is welded to the vapor barrier 2c. In the first stud bolt 4a1, the one end sides on which the screw grooves are formed are screwed to three end portions of the long nut 4a3. In the second stud bolt 4a2, screw grooves are formed on both end sides, and the second stud bolt is screwed to the end portion opposite to the end portion to which the first stud bolt 4a1 of the long nut 4a3 is screwed, and is attached to protrude to the inner portion side of the container main body 2 from the base portion 4b through the through-hole 4b3 of the base portion 4b described below. In the long nut 4a3, the first stud bolt 4a1 is screwed to the one end side, the second stud bolt 4a2 is screwed to the other end side, and the long nut connects the first stud bolt 4a1 and the second stud bolt 4a2.

In this way, the leg portion 4a in the present embodiment includes the stud bolts (first stud bolt 4a1 and second stud bolt 4a2) provided on both ends, and the long nut 4a3 to which the stud bolts are screwed.

The base portion 4b is a portion to which three leg portions 4a or the anchor 4e is attached, and is provided at a position at which the second stud bolts 4a2 of three leg portions 4a approach one another. The base portion 4b includes a center plate 4b1 on which the anchor 4e is installed via the joint 4d, and three leg portion connection plates 4b2 which are provided on edge portions of the center plate 4b1 and to which the leg portions 4a are connected. Each leg portion connection plate 4b2 is attached to the center plate 4b1 at an angle formed to oppose each surface of the concrete wall 2a forming the three-surface corner portion 2A. The leg portion connection plate 4b2 is disposed at a position at which the outer layer portion 2d1 abuts the surface of the inner layer portion 2d2 side in the above-described cold insulating material layer 2d. Moreover, the through-hole 4b3 is provided on the leg portion connection plate 4b2. The second stud bolt 4a2 of the leg portion 4a passes through the through-hole 4b3 and protrudes to the side on which the anchor 4e is installed.

The nut 4c is screwed to the second stud bolt 4a2 which protrudes from the through-hole 4b3 of the leg portion connection plate 4b2 to the anchor 4e side, and the nut abuts the surface of the anchor 4e side of the leg portion connection plate 4b2 via a washer. The nuts 4c screwed to the second stud bolts 4a2 of the leg portions 4a press the base portion 4b in different directions, and thus, the base portion 4b is fixed.

The joint 4d is attached to the center plate 4b1 of the base portion 4b and rotatably supports the anchor 4e. The joint 4d is configured to include a bolt which is in a horizontal direction orthogonal to the extension direction of the anchor 4e as an axial direction, and a nut which is screwed to the bolt and rotatably interposes the anchor 4e along with the bolt. Since the anchor 4e is supported by the joint 4d, the anchor 4e can rotate about the horizontal direction orthogonal to the extension direction of the anchor 4e.

The anchor 4e is a cylindrical member which is long in an axial direction, and screw grooves for attaching the pressing part 4f are formed on the inner wall surface of the tip portion of the anchor. In the anchor 4e, the base portion of the anchor is attached to the center plate 4b1 of the base portion 4b via the joint 4d, and the tip of the anchor to which the pressing part 4f is fixed is inserted into the through-hole 7 to be exposed toward the inside of the container main body 2. The length of the anchor 4e is approximately the same as the thickness of the inner layer portion 2d2 of the cold insulating material layer 2d. The anchor 4e is supported by the base portion 4b, and thus, the anchor is supported in the state of being separated from the concrete wall 2a.

The pressing part 4f includes a disk-shaped main body and a shaft portion which is integrated with the main body. In the main body, one side surface is formed in a partial spherical surface matching with the surface shape of the three-surface corner membrane panel M2, and the one side surface abuts the three-surface corner membrane panel M2 from the inner portion side of the container main body 2. The shaft portion is provided on the center portion of the main body, and is a columnar portion in which screw grooves are formed on the circumferential surface thereof. The shaft portion is screwed to the anchor 4e. The shaft portion is screwed to the anchor 4e to fasten the pressing part 4f, and thus, the main body presses the three-surface corner membrane panel M2 toward the concrete wall 2a, and the three-surface corner membrane panel M2 is fixed to the concrete wall 2a. In addition, the edge portion of the main body of the pressing part 4f is fixed to the three-surface corner membrane panel M2 by welding.

Figure 4:
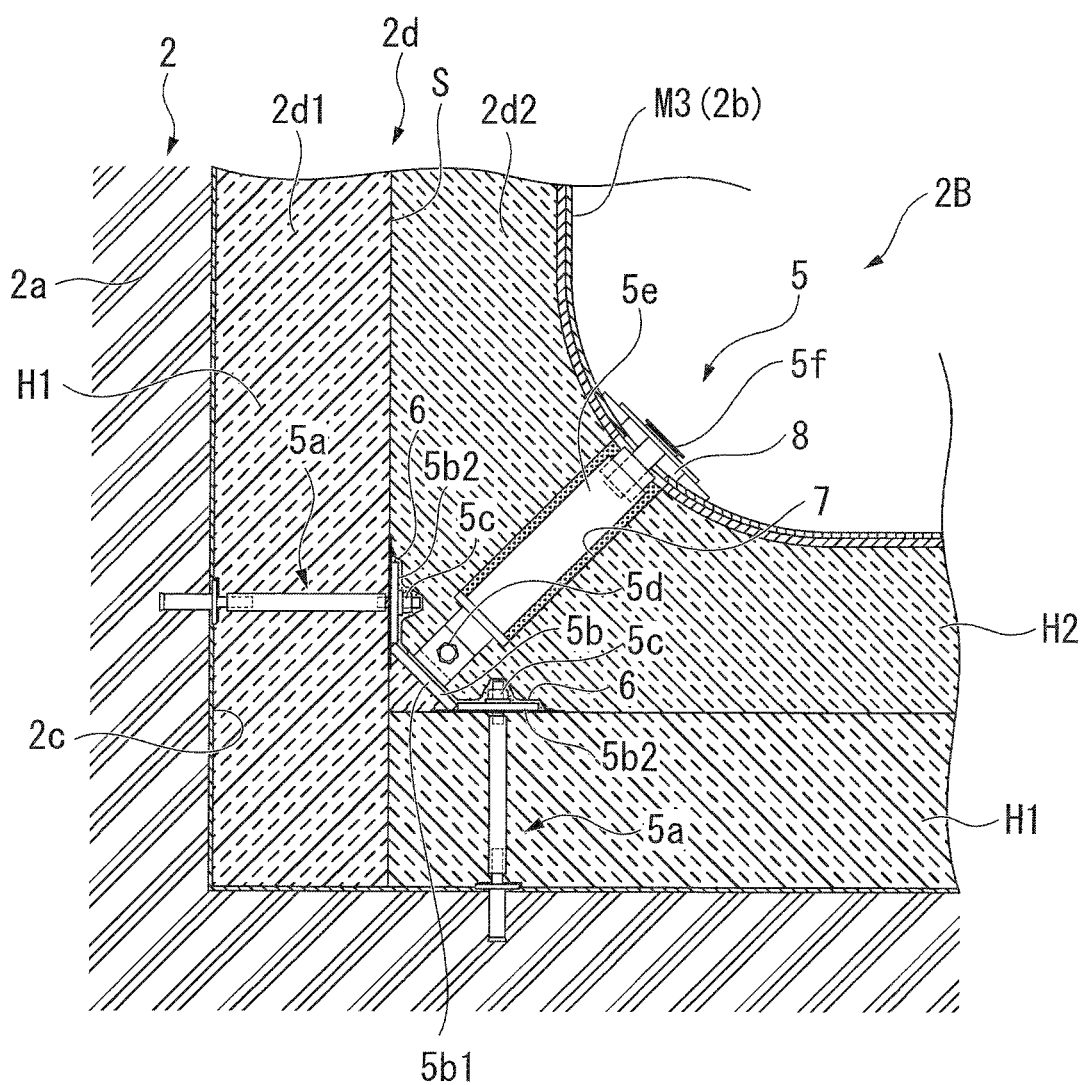
FIG. 4 is a cross-sectional view showing a two-surface corner portion including a two-surface corner membrane anchor mechanism included in the cryogenic tank according to the embodiment of the present disclosure.

FIG. 4 is a cross-sectional view showing the two-surface corner portion 2B including the two-surface corner membrane anchor mechanism 5. The two-surface corner membrane anchor mechanism 5 has the configuration similar to that of the three-surface corner membrane anchor mechanism 4. Accordingly, here, differences between the three-surface corner membrane anchor mechanism 4 and the two-surface corner membrane anchor mechanism 5 will be mainly described. The above-described three-surface corner membrane anchor mechanism 4 is installed in the three-surface corner portion 2A at which three surfaces are collected, and thus, the three-surface corner membrane anchor mechanism 4 includes a total of three leg portions 4a which are erected on the surfaces forming the three-surface corner portion 2A. On the other hand, the two-surface corner membrane anchor mechanism 5 is installed in the two-surface corner portion 2B at which two surfaces are collected, and thus, the two-surface corner membrane anchor mechanism 5 includes only two leg portions 5a.

The base portion 5b corresponds to the base portion 4b of the three-surface corner membrane anchor mechanism 4. However, since the two-surface corner membrane anchor mechanism 5 includes only two leg portions 5a, in the base portion 5b, only two leg portion connection plates 5b2 (corresponding to the leg portion connection plate 4b2) are provided with respect to a center plate 5b1 (corresponding to the center plate 4b1) on which a joint 5d is installed.

A nut 5c corresponds to the nut 4c of the three-surface corner membrane anchor mechanism 4, the joint 5d corresponds to the joint 4d of the three-surface corner membrane anchor mechanism 4, and the anchor 5e corresponds to the anchor 4e of the three-surface corner membrane anchor mechanism 4.

A pressing part 5f corresponds to the pressing part 4f of the three-surface corner membrane anchor mechanism 4. However, the pressing part 5f is different from the pressing part 4f in that the two-surface corner membrane panel M3 side of the main body is formed in a plane. Moreover, the two-surface corner membrane anchor mechanism 5 includes a spacer 8 which is installed between the pressing part 5f and the two-surface corner membrane panel M3.

Moreover, for example, if necessary, a foamed heat insulating material is filled in a slight gap or the like which is formed between the cold insulating material layer 2d, and the plane membrane anchor mechanism 3, the three-surface corner membrane anchor mechanism 4, or the two-surface corner membrane anchor mechanism 5.

The seal portion 6 is formed of an adhesive layer including a glass cloth, and as shown in FIG. 2, is provided to surround the leg portion 4a exposed to the outer layer portion 2d1 of the cold insulating material layer 2d. In addition, the seal portion 6 is provided to enclose a portion of the leg portion connection plate 4b2 shown in FIG. 3, and is provided to cover the leg portion 4a when viewed in the extension direction (that is, in the direction in which the secondary barrier layer S penetrates) of the leg portion 4a. In addition, the seal portion 6 is also filled between the leg portion connection plate 4b2 and the outer layer portion 2d1.

The seal portion 6 covers a through portion which is formed so that the leg portion 4a of the three-surface corner membrane anchor mechanism 4 penetrates the cold insulating material layer 2d including the secondary barrier layer S, and the seal portion prevents a liquid from being leaked via the through portion even if the membrane 2b is damaged.

Moreover, in addition to the through portion formed so that the leg portion 4a of the three-surface corner membrane anchor mechanism 4 penetrates the cold insulating material layer 2d, as shown in FIG. 4, the seal portion 6 is also provided on a through portion which is formed so that the leg portion 5a of the two-surface corner membrane anchor mechanism 5 penetrates the cold insulating material layer 2d. In addition, although it is not shown in the drawings, the seal portion is also provided on a through portion which is formed so that the base 3a of the plane membrane anchor mechanism 3 penetrates the cold insulating material layer 2d.

Subsequently, with reference to FIGS. 5A to 7, a forming process of the seal portion 6, which covers the through hole formed so that the leg portion 4a of the three-surface corner membrane anchor mechanism 4 penetrates the cold insulating material layer 2d including the secondary barrier layer S, will be described.

Figure 5A:
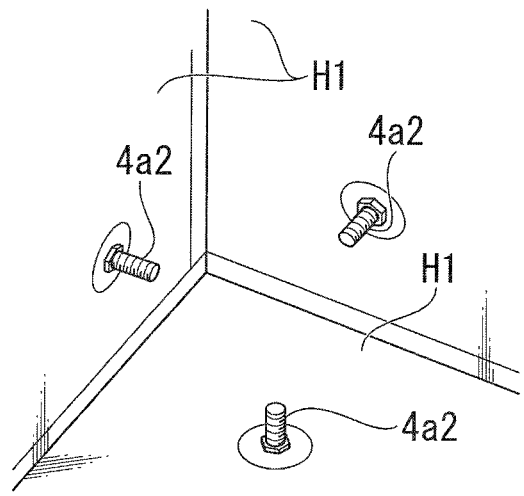
FIG. 5A is a perspective view for explaining a forming process of a seal portion included in the cryogenic tank according to the embodiment of the present disclosure.

First, as shown in FIG. 5A, in a state where only the leg portions 4a of the three-surface corner membrane anchor mechanism 4 are installed, the outer layer portion 2d1 (cold insulating panel H1) of the cold insulating material layer 2d in which the through-hole, into which each leg portion 4a can be inserted is formed, is disposed.

Figure 5B:
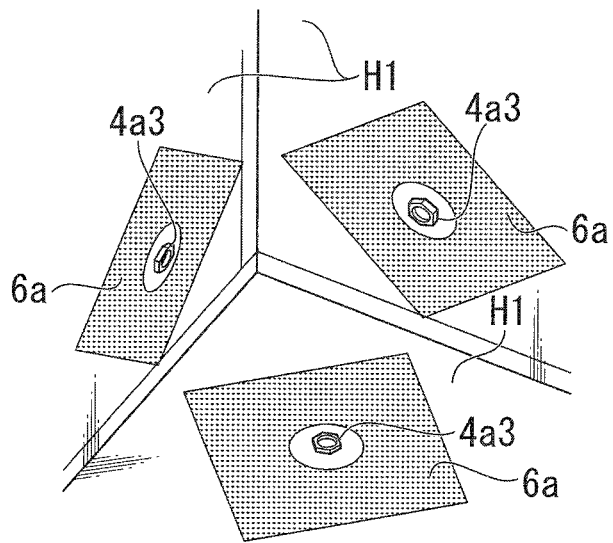
FIG. 5B is a perspective view for explaining the forming process of the seal portion included in the cryogenic tank according to the embodiment of the present disclosure.

Subsequently, the second stud bolts 4a2 of the leg portions 4a are removed, and thereafter, as shown in FIG. 5B, an adhesive 6a including a glass cloth is disposed on the surface of the outer layer portion 2d1 while avoiding the long nut 4a3. The adhesive 6a is hardened, and thus, becomes a portion of the seal portion 6. In addition, as described above, since the length of the leg portion 4a except for the second stud bolt 4a2 is approximately the same as the thickness of the outer layer portion 2d1 of the cold insulating material layer 2d, the end portion of the long nut 4a3 is approximately flush with the surface of the outer layer portion 2d1 by removing the second stud bolt 4a2.

Figure 5C:
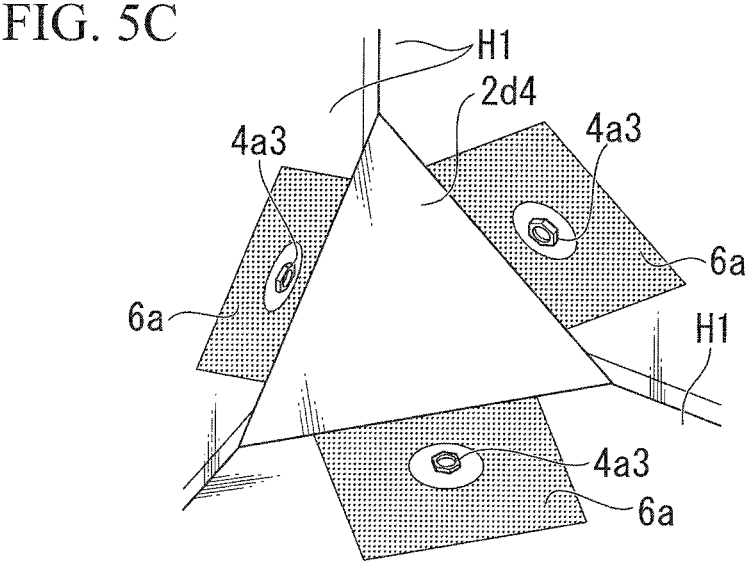
FIG. 5C is a perspective view for explaining the forming process of the seal portion included in the cryogenic tank according to the embodiment of the present disclosure.

Subsequently, as shown in FIG. 5C, the filling portion for three-surface corner portion 2d4 is installed in a corner portion which is formed of three cold insulating panels H1. The filling portion for three-surface corner portion 2d4 has a regular triangular pyramid shape including a bottom surface on which the base portion 4b of the three-surface corner membrane anchor mechanism 4 is installed.

Figure 6A:
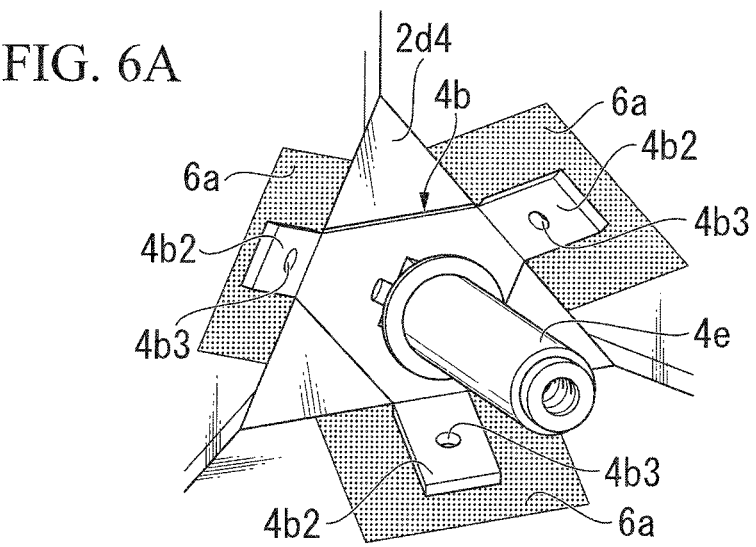
FIG. 6A is a perspective view for explaining the forming process of the seal portion included in the cryogenic tank according to the embodiment of the present disclosure.

Subsequently, as shown in FIG. 6A, the base portion 4b to which the joint 4d and the anchor 4e are attached is installed. Here, the base portion 4b is installed so that the position of each of the through-holes 4b3 of the leg portion connection plates 4b2 of the base portion 4b coincides with the end portion of each of the long nuts 4a3.

Figure 6B:
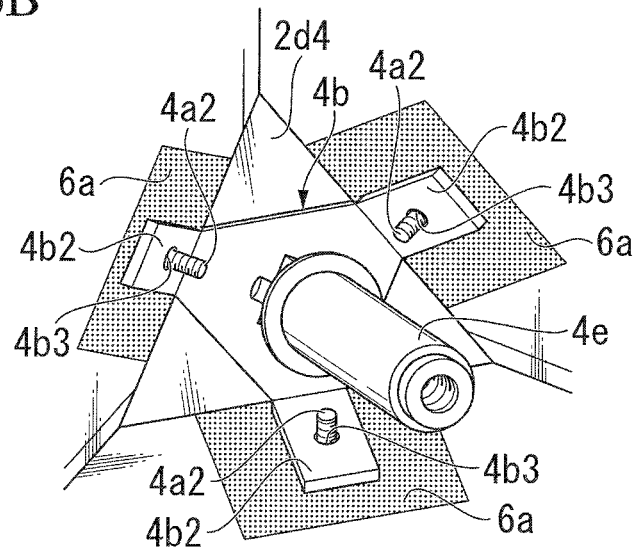
FIG. 6B is a perspective view for explaining the forming process of the seal portion included in the cryogenic tank according to the embodiment of the present disclosure.
Figure 6C:
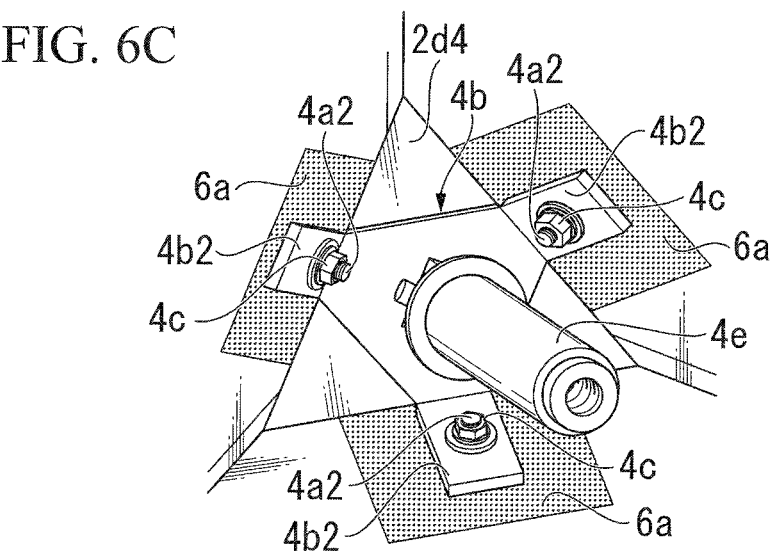
FIG. 6C is a perspective view for explaining the forming process of the seal portion included in the cryogenic tank according to the embodiment of the present disclosure.

Subsequently, as shown in FIG. 6B, each of the removed second stud bolts 4a2 is screwed to each of the long nuts 4a3 again from the outside of the leg portion connection plate 4b2. Moreover, as shown in FIG. 6C, the nut 4c is screwed to each of the second stud bolts 4a2 via a washer, the nut 4c is fastened so that the base portion 4b is pressed to the filling portion for three-surface corner portion 2d4, and each of the anchors 4e is fixed.

Figure 7:
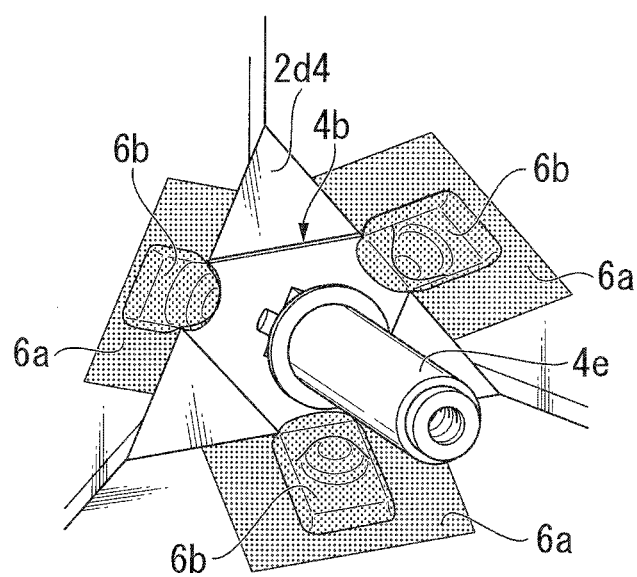
FIG. 7 is a perspective view for explaining the forming process of the seal portion included in the cryogenic tank according to the embodiment of the present disclosure.

Thereafter, as shown in FIG. 7, the adhesive 6 including a glass cloth is disposed to cover the leg portion 4a. In addition, the adhesive 6b is divided into two and is disposed, and the adhesive 6b may be disposed to be overlapped after the adhesive 6b which is disposed in advance is hardened. In addition, the adhesive 6a shown in FIG. 5B and the adhesive 6b shown in FIG. 7 are hardened, and thus, the seal portion 6 is formed.

According to the cryogenic tank 1 of the present embodiment described above, the through portion, which is formed so that the membrane anchor mechanism (plane membrane anchor mechanism 3, the three-surface corner membrane anchor mechanism 4, and the two-surface corner membrane anchor mechanism 5) penetrates the secondary barrier layer S included in the cold insulating material layer 2d, is covered by the seal portion 6. Accordingly, even if the membrane is damaged, it is possible to prevent a liquid from being leaked from the through portion. Therefore, according to the cryogenic tank 1 of the present embodiment, it is possible to improve liquid tightness.

In addition, in the cryogenic tank 1 of the present embodiment, the seal portion 6 is configured of the adhesive layer including the glass cloth. Accordingly, high sealing performance can be exerted.

In addition, in the cryogenic tank 1 of the present embodiment, the seal portion 6 is provided to cover the leg portion 4a when viewed in the extension direction (that is, a direction in which the secondary barrier layer S penetrates) of the leg portion 4a. Accordingly, it is possible to securely prevent a liquid from flowing into the through portion from the periphery of the leg portion 4a.

While preferred embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

According to the present disclosure, it is possible to improve the liquid tightness of the cryogenic tank which includes the membrane anchor mechanism penetrating the secondary barrier layer.

What is claimed is:

1. A cryogenic tank comprising:
  a heat insulating material layer which is disposed between a concrete wall and a membrane and includes a secondary barrier layer in an inner portion of the heating insulating material; and
  a membrane anchor mechanism which penetrates the secondary barrier layer, is fixed to the concrete wall, and presses the membrane,
  wherein the membrane anchor mechanism includes a seal portion which covers a through portion penetrating the secondary barrier layer, and
  wherein the seal portion is an adhesive layer including a glass cloth.

2. A cryogenic tank according to claim 1,
  wherein the membrane anchor mechanism includes a leg portion which penetrates the secondary barrier layer, and
  wherein the seal portion is provided to cover the leg portion when viewed in a direction in which the leg portion penetrates the secondary barrier layer.

* * * * *